United States Patent Office 3,616,729
Patented Nov. 2, 1971

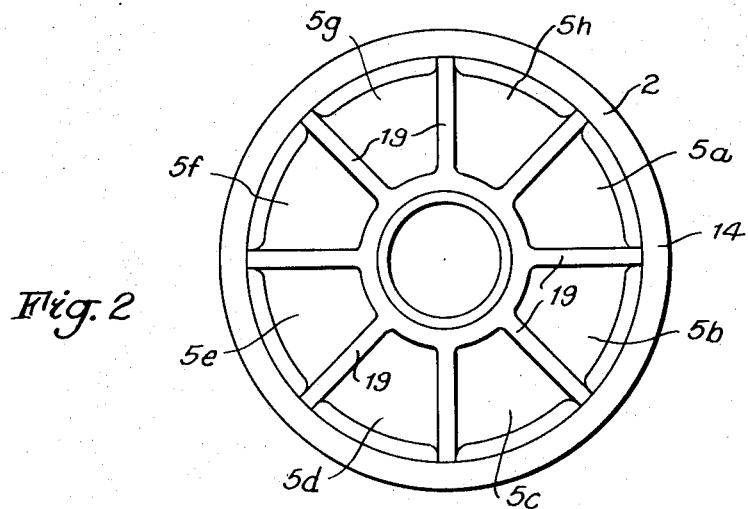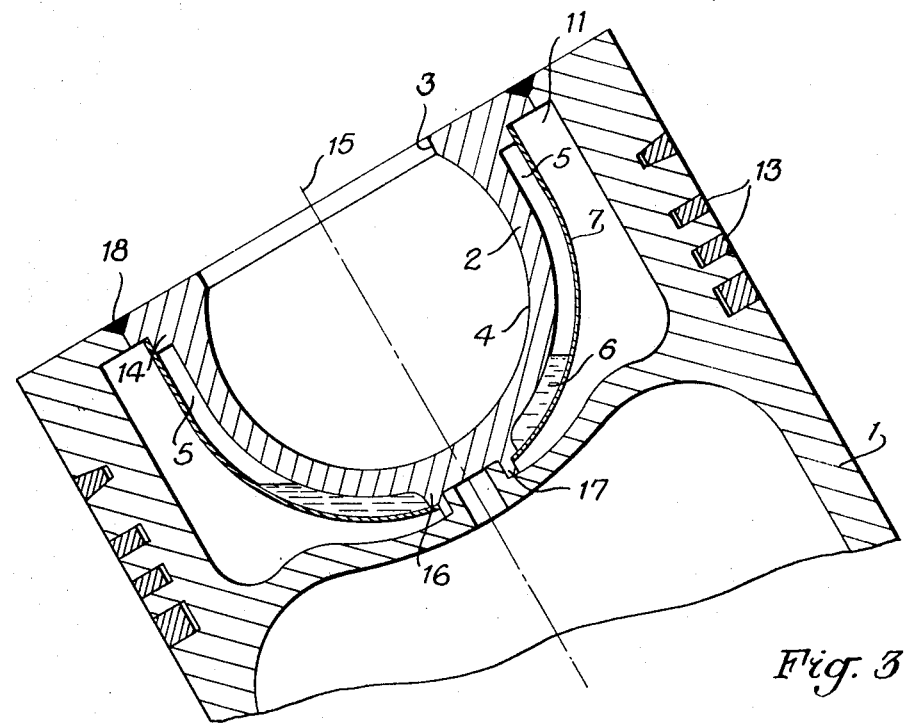

3,616,729
PISTON COOLING FOR INTERNAL COMBUSTION ENGINE
Hans Fischer, Nuremberg, Germany, assignor to Maschinenfabrik Augsburg-Nurnberg Aktiengesellschaft, Nuremburg, Germany
Filed Dec. 2, 1969, Ser. No. 881,389
Claims priority, application Germany, Dec. 12, 1968, P 18 14 123.6
Int. Cl. F01p *3/06, 3/10*
U.S. Cl. 92—176                                     6 Claims

ABSTRACT OF THE DISCLOSURE

A piston having a combustion chamber surrounded by an inner cooling chamber partially filled with a coolant solid at lower temperatures but melted at the operating temperature for the piston in which the inner cooling spaces are segmented to provide symmetrical disposition of the coolant when the piston is used in a sloping position, and also to provide for use of coolants of different melting points in one or more segments of the inner cooling chamber to compensate for unequal heating of the combustion chamber walls.

---

This invention relates to a method and more especially to an apparatus for the cooling of the piston of an internal combustion engine of the type having a combustion chamber and with an interior and outer cooling chamber, in which the temperature of the wall of the combustion chamber is automatically controlled depending upon the temperature of the intake air and also depending on the prevailing engine load, whereby the two cooling chambers are completely separate from one another and the inner cooling chamber is partially filled with a heat conduction and preferably metallic material or with an organic substance or mineral material with a predetermined melting point according to patent application Ser. No. 744,017, filed by the applicant on July 11, 1968, now Pat. No. 3,545,341.

The inner cooling chamber in the said piston is arranged around the combustion chamber and/or around the insert forming the combustion chamber, and is used for the purpose of controlling the temperature in the wall of the combustion chamber of the piston with due regard to the corresponding condition of load of the engine, in other words, during the starting of the engine, during the idling and with a small partial load it is necessary that the wall of the combustion chamber be insulated as well as possible so that it reaches its required temperature as quickly as possible and/or retains same. On the other hand, during full load and/or when the required high temperature has been reached, the discharge or dissipation of the heat needs to be increased automatically to such a point that overheating of the engine cannot occur.

On the other hand, the outer cooling chamber, which is completely independent of the inner cooling chamber, is provided for the uniform cooling of the outer side of the piston which is presented toward the wall of the cylinder, and in which the piston rings are arranged so that a satisfactory lubrication is guaranteed and carbonization of the lubricating oil in the piston ring grooves would be prevented and, thus, a burning of the piston rings, which could get them carbonized in such a manner that they become stuck in place, would not occur. It is also used for the cooling of the cooling agent in the inner cooling chamber during partial load and also during full load operation of the engine. The cooling agent that we prefer in this case in the outer chamber is the lubricating oil of the engine the temperature of which is controlled in the well-known manner.

It is preferred to use for instance Woods-Metal for the cooling agent in the inner cooling chamber—as already described in the aforesaid application—which becomes liquid only when it has reached a temperature ranging between 180 and 250° C. As long as the temperature of the wall of the combustion chamber lies below this range, this cooling agent is a fairly solid and rigid mass at the bottom of the cooling chamber, while the remaining, air-filled portion of said cooling chamber provides heat insulation. When the required, theoretical temperature has been reached, then the cooling agent in the inner cooling chamber becomes liquid and is moved or shaken up and down with the upward and downward movement of the piston (so-called "shaker-cooling method"), whereby, at this point, there is a rapid dissipation of heat from the upper range or area of the wall of the combustion chamber where the highest temperature is reached. Due to this rapid dissipation of heat, the wall of the combustion chamber is held at a favorable level of temperature.

While the cooling method described in the aforesaid application S.N. 744,017 has proved quite satisfactory, in practice, however, when the arrangement of the cylinder lies in a sloping plane, such as in V-engines, for instance, it has certain disadvantages rendering it not entirely satisfactory. Actually, in such an installation, it is a fact that, when the temperature of the combustion chamber drops, the cooling agent no longer solidifies on the bottom of the cooling chamber, that is, in the center of the combustion chamber, but rather, depending upon the inclination of the cylinder, there will be a displacement of the solid cooling agent in a sidewise direction with regard to the longitudinal axis of the piston. Even though the unsymmetrical displacement of the weight which arises automatically when the solid cooling agent shifts cannot by itself be regarded as being a disadvantage, unfortunately this condition still has the unfavorable effect that the displaced cooling agent, in correspondence with the inclination of the cylinder, takes an eccentric position on the lower lying outer side of the upper half of the insert of the combustion chamber and makes contact with it and solidifies and becomes rigid at that point. Therefore, a relatively high dissipation of heat occurs when the engine is started. This heat dissipation takes place at the upper half of the wall of the combustion chamber, which is partially surrounded by the still solid cooling agent, and onto which the liquid fuel is sprayed or injected. This, however, is not desirable, because it is this very part of the combustion chamber which, according to the method as described in the aforesaid application, is supposed to be warmed up as quickly as possible to its desired or required theoretical temperature to prevent an incomplete combustion and the formation of blue smoke which arises thereby. Only when the cooling agent becomes liquid is it desirable that heat is dissipated from this area. This disadvantage of the earlier piston for use in V-engines has its detrimental effect also when the engine is idling within the lower range of partial load, when the cooling agent becomes slowly rigid and solidifies once again.

Because of the said displacement of the cooling agent, a further serious disadvantage occurs in the irregular dissipation of the heat from the upper half of the wall of the combustion chamber and a quite irregular heating-up of this zone as long as the cooling agent is still in a solid and rigid condition. While it is a fact that the lower half of the wall of the combustion chamber is cooled relatively well, it is also a fact that the upper half of the wall of the combustion chamber is very well insulated by the air that has been pushed upwardly.

It is therefore the object of this present invention to improve the old and known cooling method and the apparatus required therefor, and/or rather the structural arrangement of it in such a manner that the said disadvantages are eliminated and that a satisfactory functioning of the cooling device is guaranteed even when the cylinder lies in a sloping plane.

According to this invention, this problem is solved in that the inner cooling chamber is subdivided into several chambers which are sealed liquid-tight. That is, they are divided into such individual chambers that, at any given time, the same amount of the cooling agent, which consists of a heat conducting material, can be received by each of them. The subdivision of the cooling chamber is arranged in this particular case in such a manner that the freedom of movement of the cooling liquid, when in its liquid condition, is restricted only in the direction of the circumference of the combustion chamber in planes normal to the longitudinal axis, but the liquid is not restricted in the direction of the longitudinal axis of the cylinder or piston, so that, when the piston is in a sloping position, a displacement of the solidifying cooling agent to one side of the upper half of the cooling chamber is prevented, as also is unequal spraying and coating of the wall of the insert of the combustion chamber in its upper half as the material is violently agitated by motion of the piston.

Because of the subdivision of the cooling chamber into several individual chambers which are separate from one another, there also exists the possibility of producing a varying cooling of the different zones of the wall of the combustion chamber because of the use of various materials as the cooling agent in the individual chambers. Such materials known in the art include metals that melt at different temperatures, salts, sulphur, and so forth, which may be selected for its known characteristics.

This division is accomplished by means of ribs which are provided on the surface of the insert forming the combustion chamber away from the combustion chamber itself, which ribs are evenly distributed about the entire surface and extend in the direction of the longitudinal axis of the cylinder and to the center point of the insert of the combustion chamber. The outer surface of the cooling chamber is provided in the well-known manner by means of a shell or cup which can be slid onto the insert of the combustion chamber and which is connected by welding before installation of the combustion chamber into the piston, with an upper collar or sleeve and a lower hub as well as also with the ribs of the insert of the combustion chamber.

The outer cooling chamber, accordinng to a further development of this invention, is constructed in such a manner that it surrounds the interior cooling chamber and the shell or cover which closes the inner cooling chamber, whereby, during partial load and full load operation of the engine, a re-cooling of the cooling agent, which is present in the inner cooling chamber, occurs.

The means by which the objects of this invention are obtained are described more fully with reference to the accompanying drawings, in which:

FIG. 2 is a view of the insert of the combustion chamber according to the invention as seen from the bottom in FIG. 1; and FIG. 3 is a view similar to FIG. 1 of a portion of the piston in a position of approximately 30° angle to the vertical.

In these drawings, the same reference characters for the same elements appear as in said aforesaid application Ser. No. 744,017.

Figure 1:
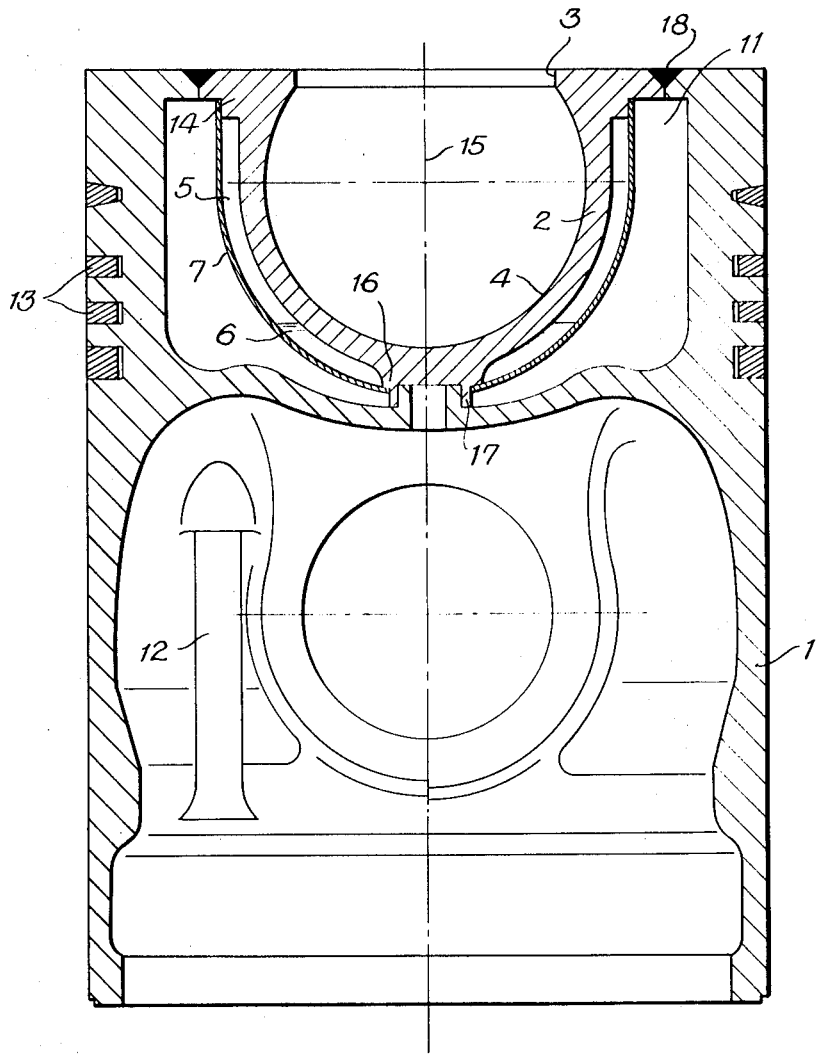
FIG. 1 is a longitudinal section through a vertically disposed piston with the cooling chamber according to this invention.

As shown in FIG. 1, piston body 1 of the internal combustion engine has an insert 2 forming the combustion chamber 4 and is provided with a constricted throat 3. The inner cooling space or chamber 5 surrounds insert 2. The cooling agent 6 partially fills inner cooling chamber 5 between the insert 2 and the shell or cup 7 which when slid into and welded in place forms the outer limit or border of the cooling chamber 5. The outer annular cooling chamber or space 11 surrounds the entire shell or cup 7. The nozzle 12 which catches oil from the engine lubricating system leads oil to space 11. The piston rings 13 are in the piston ring zone. The insert 2 forming the combustion chamber is provided on its top surface which is above cooling chamber 5 with a collar or portion 14, and at its bottom with a hub 16, coaxial of the cylinder and axis 15 of the piston. The collar portion 14 is used as the upper closure of the cooling chamber, while the hub 16 is used as the lower closure member of the cooling chamber. The shell or cup 7 lies tight against those two closing members. An elongation 17 of hub 16 of the insert 2 forming the combustion chamber is provided for centering and attaching the insert during its installation in piston 1. Insert 2 of the combustion chamber is then rigidly connected with the piston 1 by means of a welding seam 18.

Insert 2 forming the combustion chamber is shown in FIG. 2 from its bottom side, which means its surface which is turned toward the cooling chamber 5, and it is provided between the collar 14 and the hub elongation 17 with several uniformly distributed longitudinal ribs 19 extending across the entire surface from 14 to 17. Because of the longitudinal ribs 19, which are connected with the shell or cup 7 by a tight seal, just as the collar 14 and the hub 17 are, the cooling chamber 5 is divided into several identical chambers 5a to 5h. The same amount of the cooling agent 6, FIG. 1, is provided in each of said identical chambers.

From FIGS. 1 and 2, it is clear that the cooling agent 6, when in a liquid condition, will impart to the wall 4 of the combustion chamber a sufficient cooling effect, because of the movements of the piston 1, shaking the material in chambers 5a and 5h.

If the piston 1, as is shown in FIG. 3, is installed in a sloping position, then the cooling agent 6 will be displaced to a slight extent, in that it always comes to rest at the lowest point of the chambers 5a to 5h, respectively; however, it remains essentially evenly distributed at the bottom of the insert 2 of the combustion chamber around the hub 16 and cannot be displaced so far that, in its solid or rigid condition, it would reach the upper half of the cooling chamber 5 on the lower side of the combustion chamber or that it comes to rest at the outer wall of the insert 2 of the combustion chamber. The upper portion of the wall 4 of the combustion chamber, then, because of this arrangement, remains insulated by means of the layer of air which surrounds it until it has reached its required theoretical range of temperature, and the cooling agent 6 is again in a liquid form. It is only then that the entire surface of the combustion chamber is uniformly cooled.

Having now described the means by which the objects of this invention are obtained, I claim:

1. An internal combustion engine piston comprising a piston body, a piston ring zone about the periphery of said body, and a wall forming a combustion chamber in said body, means defining a plurality of segmented and liquid-tight circumferentially disposed inner cooling spaces surrounding said combustion chamber, heat conducting material means of a material that will change from a solid to a liquid when the combustion chamber wall reaches a preselected temperature partially filling each of said segmented cooling spaces whereby, when in a liquid state, heat will be removed from said combustion chamber wall by said heat conducting material means by the intense agitation thereof, and means defining an outer cooling space disposed between said segmented cooling spaces and said piston ring zone.

2. The piston of claim 1 in which the piston body including the piston ring zone is formed separately from said wall forming said chamber, said piston body and said wall being provided with cooperating centering means to assure proper positioning of said wall in said piston body.

3. The piston of claim 2 in which said wall forming said combustion chamber is exteriorly ribbed, thereby partially forming said segmented cooling spaces, said ribs forming boundaries in radial planes between said segmented inner cooling spaces.

4. The piston of claim 2 in which said segmented cooling spaces are bounded on their sides remote from said combustion chamber wall by a shell element welded to said wall.

5. The piston of claim 1 in which the heat conducting material means in each of the several segmented spaces is the same.

6. The piston of claim 1 in which the heat conducting material means in at least one of said segmented inner cooling spaces is different than the heat conducting material means in the other said segmented inner cooling spaces.

References Cited

UNITED STATES PATENTS

| | | | |
|---|---|---|---|
| 1,678,957 | 7/1928 | Philipp | 123—41.16 |
| 1,852,105 | 4/1932 | Boyd | 92—176 X |
| 2,058,741 | 10/1936 | Taylor | 92—176 |

FOREIGN PATENTS

| | | | |
|---|---|---|---|
| 288,136 | 9/1928 | Great Britain | 123—41.16 |

MARTIN P. SCHWADRON, Primary Examiner

I. C. COHEN, Assistant Examiner

U.S. Cl. X.R.

92—186; 123—41.16, 41.35, 41.42